(12) United States Patent
Jacobson et al.

(10) Patent No.: US 6,200,508 B1
(45) Date of Patent: Mar. 13, 2001

(54) METHOD OF FABRICATING ELECTRO-MECHANICAL DEVICES BY MULTILAYER DEPOSITION

(75) Inventors: Joseph M. Jacobson; Jonathan Albert, both of Cambridge; Neil Gershenfeld, Somerville, all of MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 08/958,098

(22) Filed: Oct. 27, 1997

Related U.S. Application Data

(60) Provisional application No. 60/029,620, filed on Oct. 25, 1996.

(51) Int. Cl.[7] .............................. B29C 41/22; B29C 41/20
(52) U.S. Cl. .......................... 264/104; 264/254; 264/255; 264/272.19; 264/308; 264/427
(58) Field of Search .......................... 264/104, 255, 264/105, 254, 131, 132, 427, 272.11, 272.19, 272.2, 250, 308

(56) References Cited

U.S. PATENT DOCUMENTS

| | | | |
|---|---|---|---|
| H1523 | * 4/1996 | Mammone et al. | 264/104 |
| 4,935,174 | * 6/1990 | Suzuki et al. | 264/255 |
| 5,403,527 | * 4/1995 | West | 264/104 |
| 5,407,622 | * 4/1995 | Cleveland et al. | 264/104 |
| 5,518,674 | * 5/1996 | Powell et al. | 264/104 |
| 5,714,102 | * 2/1998 | Highum et al. | 264/105 |

FOREIGN PATENT DOCUMENTS

WO 98/03896   1/1998   (WO).

* cited by examiner

*Primary Examiner*—Angela Ortiz
(74) *Attorney, Agent, or Firm*—Testa, Hurwitz & Thibeault LLP

(57) ABSTRACT

Printing techniques are used to build three dimensional structures by depositing successive layers of the device onto a substrate. The layers and/or portions thereof are different materials, e.g., conductors and insulators, which provide the desired functional characteristics of the device. The substrate may be used only to provide a support for the printing process, in which case it will usually be removed after the device is fabricated, or may instead be a functioning part of the fabricated device.

8 Claims, 4 Drawing Sheets

METHOD OF FABRICATING ELECTRO-MECHANICAL DEVICES BY MULTILAYER DEPOSITION

Reference to related application U.S. Provisional Patent application 60/029,620 filed Oct. 25, 1996.

FIELD OF THE INVENTION

This invention relates to the fabrication of electromechanical devices. In particular it relates to the fabrication of such devices by depositing successive layers of different materials.

BACKGROUND OF THE INVENTION

The invention is primarily directed to the fabrication of small devices such as miniature switches, motors and the like. The manufacture of these components with conventional techniques is difficult and expensive, and this can be an impediment to large scale use of the devices in wearable systems and other applications where size and weight are important limitations.

Accordingly, it is an object of the invention to provide an improved method of fabricating electromechanical devices. A more specific object is to provide a method which is relatively low in cost. A further object is to provide a method of fabricating electro-mechanical devices which is also efficient for low-volume production for prototypes and the like used in the development and testing of systems employing these devices.

SUMMARY OF THE INVENTION

The invention makes use of printing techniques to build three dimensional structures. Specifically, it deposits on a substrate support successive layers of a device, the layers and/or portions thereof being of different materials, e.g., conductors and insulators, to provide the desired characteristics of the device. The substrate support may be used only to provide a support for the printing process, in which case it will usually be removed after the device is fabricated. Alternatively, the support may be a functioning part of the fabricated device.

In the preferred embodiment of the invention the deposition process is accomplished by means of a conventional ink jet technique, by projecting through a set of nozzles the constituent materials of the various portions of the fabricated device. The nozzles may have a fixed orientation and be translatable along three axes, in which case the device being fabricated will be constructed as a succession of parallel planar layers. The same progression of layers may be obtained by printing the layers through a succession of masks.

In another arrangement the nozzles are provided with an essentially complete range of movement. Specifically, they are mounted for three axes translation and their orientations can be varied about two axes of rotation. This facilitates the fabrication of parts having complex structures.

While the invention is particularly useful in the fabrication of miniature components, it is by no means limited to small sizes. Larger devices can also be constructed and for such devices the invention is particularly useful when small quantities are desired.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
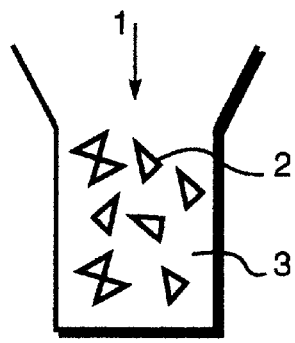
FIG. 1A depicts an ink used in fabricating devices in accordance with the invention.

As shown in FIG. 1A, ink 1 for use in practicing the invention may comprise particles 2 having desired properties dispersed in a vehicle 3. The particles may, for example, have semiconductive properties, in which case they may consist of such materials as silicon, germanium, GaAs or other suitable semiconductive material. Also, they may contain n-type dopants such as phosphorous, antimony or arsenic, or p-type dopants such as baron, gallium, indium or aluminum, as known in the art of semiconductor fabrication. Alternatively, the semiconductors may be polymeric in nature (in particulate or molecular form) and dispersed or dissolved in an appropriate solvent (e.g. water). Suitable polymeric semiconductors include pentacene, C60, phthalocyanine, a-w-dilexyhexathiopene, and others well known to those skilled in the art. The vehicle 3 may be a vinyl or other resin that is heat curable or UV curable or any other suitable binder known in the art of electrically conducting inks. In some cases the vehicle 3 will not be used as a binder for the deposited particles. The vehicle will then be removed chemically or by evaporation. The preferred vehicle will depend on the application. For example, some binders may require a curing or evaporation temperature that previously deposited materials cannot withstand.

Moreover, the vehicle itself may possess the desired properties of the material to be deposited, e.g., electrically insulating, in which case there will be no need to suspend particles in the vehicle.

Figure 1B:
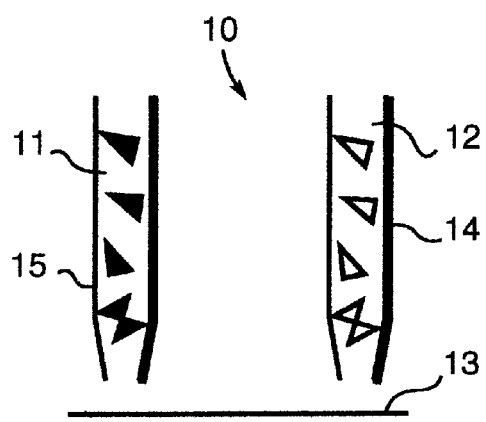
FIG. 1B illustrates a multiple-nozzle arrangement for depositing various inks in layers on a substrate.
Figure 1C:
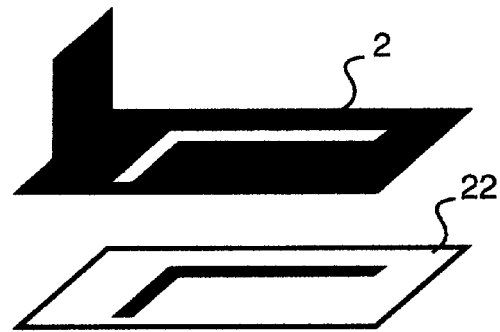
FIG. 1C depicts the use of masks to deposit an ink layer in accordance with the invention.

The ink 1 may be applied by various printing techniques. These techniques include a fluid delivery system 10 in which inks 11 and 12 having different electrical properties may be deposited in a desired pattern on a substrate 13 by means of nozzles 14 and 15, as shown in FIG. 1B. Alternatively, the ink 1 may be printed by means of a screen process in which the ink is forced through a patterned aperture mask 21 onto a substrate 22 to form the desired pattern, as shown in FIG. 1C. In either case the resulting pattern, when cured, brings the particles 2 into contact so as to create a continuous semiconductive structure in the case of particles, or a conductive structure when the particles are of electrically conductive material.

Figure 2A:
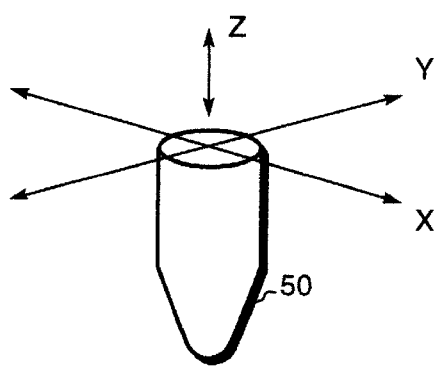
FIG. 2A illustrates the use of nozzles translatable along three axes and having a fixed orientation.
Figure 2B:
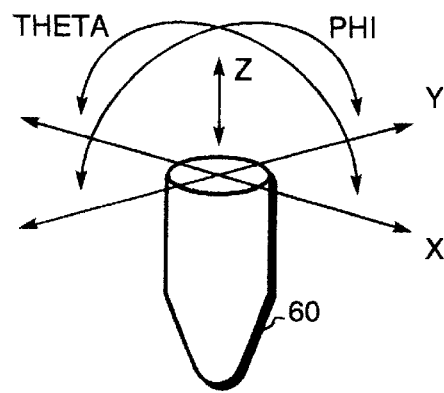
FIG. 2B illustrates the use of nozzles translatable along multiple axes and rotatable about multiple axes of rotation.

As shown in FIG. 2A nozzles 50 can be mounted for translation along three axes, for building a structure by depositing successive layers on the substrate (not shown). FIG. 2B illustrates a nozzle 60 mounted for five-axis movement. Specifically, the nozzle 60 is translatable along three axes and rotatable about the two horizontal axes. The additional degrees of freedom permit the building of structures in more versatile ways.

Figure 2C:
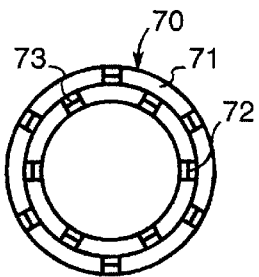
FIG. 2C illustrates a nozzle having a variable orifice size.

FIG. 2C illustrates a variable aperture nozzle 70 that allows the changing of deposition rates of the ink by changing the orifice size. The nozzle 70 is comprised of multiple sections 71 that can be expanded and contracted with respect to each other through gaps 72. The gaps contain compression springs 73 that urge the sections 71 apart. The orifice size can thus be controlled by applying a constrictive force to the circumference of the nozzle, as is well-known in the construction of chucks and collets. With this arrangement structures of different scale can be built at different rates and with different accuracies by using the appropriate orifice sizes.

Figure 2D:
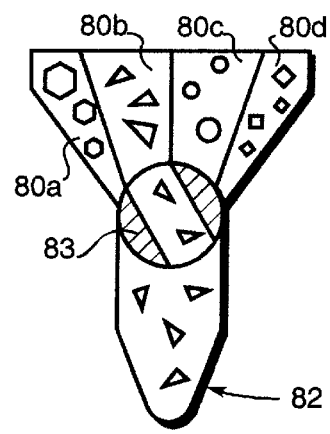
FIG. 2D illustrates the use of a single nozzle to deposit multiple inks.
Figure 2E:
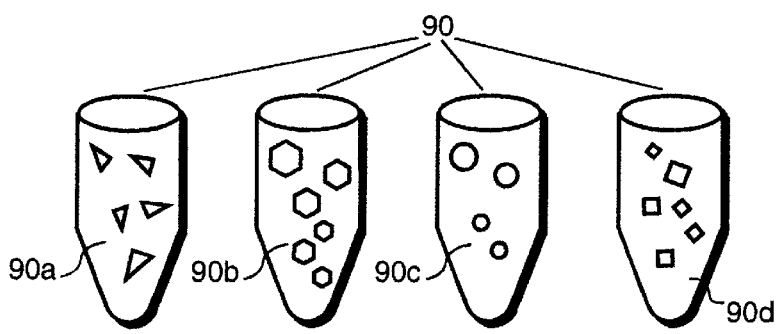
FIG. 2E depicts the use of four nozzles that are used for depositing inks having four different characteristics.

Since the invention involves the deposition of different materials in successive layers and/or in various parts of each layer, multiple nozzles 90a–90d for depositing different inks may be employed as shown in FIG. 2E. In general these nozzles will be mounted to a structure (not shown) that translates them in unison and permits individual z-axis (FIG. 2A) movement. When the five-axis arrangement of FIG. 2B is used the nozzles 90a–90d will ordinarily be separately rotatable of about the x and y axes (FIG. 2B).

Another arrangement for depositing multiple inks is shown in FIG. 2D in which a nozzle 82 is provided with a valve 83 for selecting among the inks in multiple reservoirs 80a–80d.

Figure 3A:
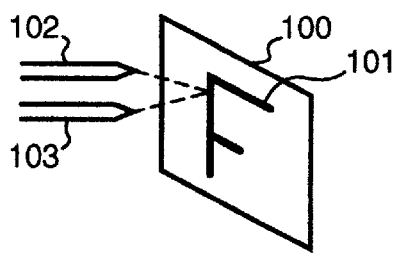
FIGS. 3A–3F illustrate various arrangements for depositing materials on an underlying substrate in accordance with the invention.
Figure 3B:
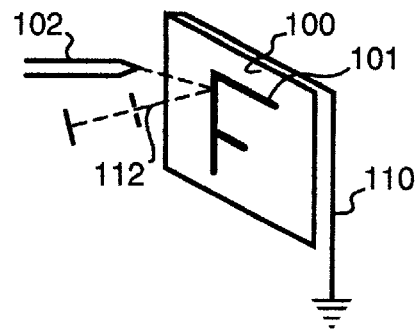

In FIG. 3A we have illustrated an arrangement in which a pair of nozzles 102 and 103 are used together to deposit a single material on a substrate 100 to form a pattern 101. In this example the nozzle 102 deposits a metal or semiconductive salt on the substrate 100 and the nozzle 103 deposits a reducing material. As an example, to form a metallic pattern, silver nitrate ($AgNO_3$) may be deposited by the nozzle 102 and a suitable aldehyde may be projected from the nozzle 103. Other examples of chemistry suitable for this arrangement are known in the art of electroless plating. In FIG. 3B we have illustrated a similar process in which an electron beam 112 is used instead of the reducing agent of FIG. 3A to effect a reduction of a metal or semiconductive salt deposited by the nozzle 102. A ground plane 110 may be employed to ground the electron beam.

Figure 3C:
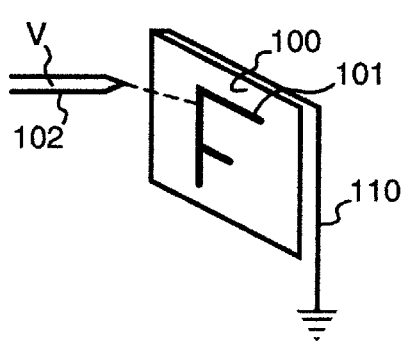

Electro-plating of a pattern may be employed as illustrated in FIG. 3C. A metal or semiconductive salt, to which a potential V is applied, is deposited by the nozzle 102 on the substrate 100, thus forming a metallic or semiconductive trace.

Figure 3D:
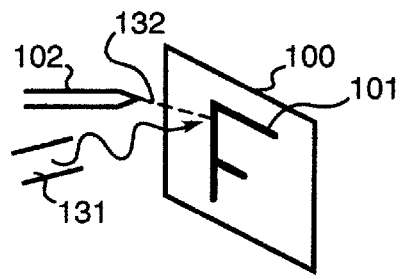

In FIG. 3D we have illustrated the use of UV reduction of a metal salt deposited by the nozzle 102. The nozzle forms a jet 132 containing a metal or semiconductive salt and an ultraviolet source 131 directs a beam of radiation at the pattern traced by the nozzle 102, thereby reducing the salt into the conductive or semiconductive trace 101. Alternatively, the jet 132 may contain a photoconductive material mixed with the metal salt. The metal in the trace deposited by the nozzle 102 may thus be electroplated on to the substrate 100 by the application of light from the source 131, as is known in the field of photoconductive electroplating.

Figure 3E:
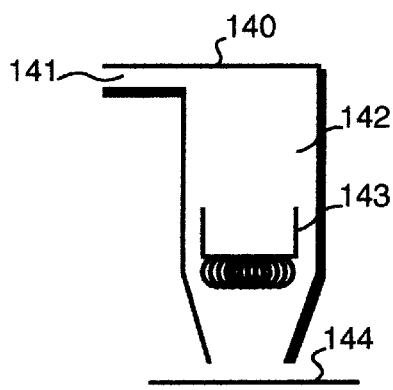

In FIG. 3E we have illustrated a nozzle 140 which defines a chamber 142 that is filled with an inert gas via an inlet 141 and contains thermal, sputtering electron beam or other deposition means 143. The nozzle 140 may print a metallic semiconductor, insulator or other material in an arbitrary pattern on a large class of substrates 144. In some cases the substrate 144 will be cooled or chilled to prevent damage from the deposition materials, which may be at an elevated temperature.

Figure 3F:
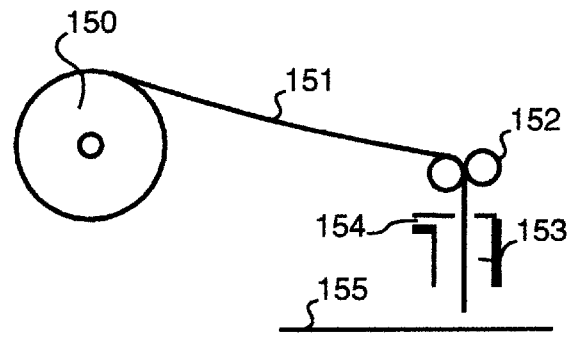

In FIG. 3F the material from a wire 151 is applied to a substrate to form a desired pattern. The wire is fed from a spool 150 by drive rollers 152 into a chamber 153 supplied with an inert gas by way of an inlet 154. Material from the wire is deposited on a conductive surface 155 by means of an arc process in which the wire is melted and projected onto the surface by means of an electric arc.

Figure 4A:
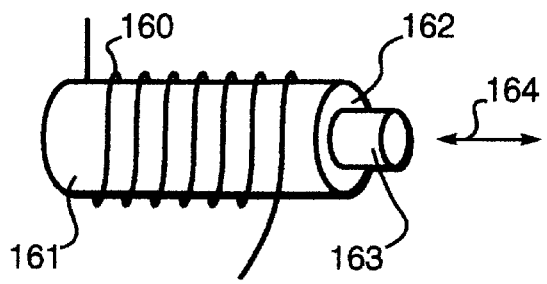
FIG. 4A depicts a solenoid fabricated in accordance with the invention.

FIG. 4A illustrates a solenoid which may be fabricated by means of the invention. The solenoid comprises a main tube 161 made of a nonconductive material. A conductive layer 160 in the form of a helical coil has been deposited on the outer surface of the tube 161 and a cylindrical armature 163 is disposed within the tube 161.

The solenoid may be fabricated in several ways in accordance with the invention. For example, it can be built up on a horizontal substrate (not shown), with the axis of the solenoid vertical during the manufacturing process. A three-axis nozzle arrangement can then deposit successive layers, each of which is a cross section of the solenoid, comprising a portion of the tube 161 the winding 160 and the armature 163. With three nozzles, one of the nozzles will deposit metallic material for the winding, a second nozzle will deposit insulating material for the tube, and the third nozzle will deposit a ferromagnetic material for the armature.

In a similar arrangement a five-axis nozzle may be used so as to deposit the materials laterally. In that case a vertical mandrel (not shown) may first be fixed in position and then used as a substrate for successive layers which are cylindrical in configuration.

A rotating mandrel may also be used as a substrate, in which case the material-depositing nozzles need to be movable in only two directions, i.e., parallel to the axis of rotation and perpendicular to the axis.

With further reference to FIG. 4A the armature 163 should be movable back and forth in the axial direction as indicated by the arrows 164. Accordingly, the layer deposited on the surface of the armature should be non-adherent to the armature and preferably also have a lubricating quality. The tube 161 may be of a material, such as, Teflon, which possesses these properties. Alternatively, a layer 162 may be formed between the tube 161 and the armature 163 that possesses these properties or is removable in a post-printing operation by means of a solvent.

The layer 162 may also be a suitable release agent which prevents adherence of the tube 161 to the armature 163, and further provides the desired lubrication characteristic.

Figure 4C:
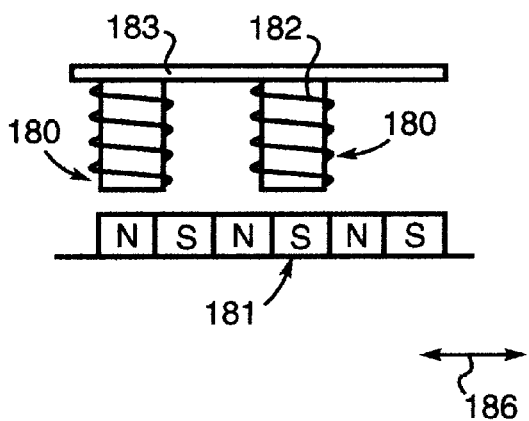
FIG. 4C depicts a linear motor fabricated in accordance with the invention.

In FIG. 4C we have illustrated a linear actuator comprising a pair of solenoids 180 mounted on a ferromagnetic back plate 183 and containing magnetic cores (not shown) affixed to the plate 183. The entire structure comprising the solenoids 180 and back plate 183 may be fabricated by three-axis movement of nozzles which lay down successive horizontal layers of the back plate 183 and then the solenoids 182. The movable member 181 of the actuator can be formed, by means of the invention, by laying down suitable permanent magnet material and then polarizing it as shown. The coils 182 of the solenoids can be energized in such fashion as to translate the member 181 back and forth in the direction of the arrow 186. It will be apparent that similar structures fabricated according to the invention can provide a circular motion.

Figure 4B:
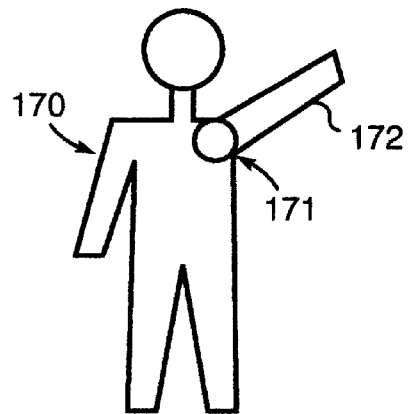
FIG. 4B depicts a structure incorporating an actuator fabricated in accordance with the invention.

FIG. 4B is an example of a use of an electric-mechanical system fabricated in accordance with the invention. A structure 170 provides a substrate for actuators and logic circuitry. A rotatable member 172 extends from an actuator 171, the magnetic portion of which is an electro-mechanical rotary actuator, such as a stepper motor.

What is claimed is:

1. A method of fabricating a three-dimensional, electro-mechanical component composed of a plurality of portions consisting of different materials, said method comprising the steps of:

preparing a substrate;

selecting the materials so that the material from a first of said plurality of sources is an electrically non-conductive material and the material from a second plurality of sources is an electrically conductive material;

movably mounting a plurality of material sources opposite the substrate so that material from each source may be directed toward the substrate;

controllably activating while moving said first and second in at least two dimensions so that the materials from said sources are deposited in layers on the substrate to build up said portions on the substrate layer by layer, so that said non-conductive material is laid down to form a non-conductive portion and said conductive material is laid down to form a conductive portion electromechanically cooperative with the non-conductive portion, and continuing the activating while moving step until all of the layers of all of the materials collectively form the component, said materials being deposited by said sources being selected so that at least one of said plurality of portions is movable relatively.

2. The method defined in claim 1 including the step of selecting the plurality of sources from the group consisting of fluid jetting, electro-plating and electroless-plating apparatus.

3. The method defined in claim 1 including the additional step of separating said substrate from said plurality of portions.

4. The method defined in claim 1 including selecting the materials so that the material from a first of said plurality of sources is a semiconducting material.

5. The method defined in claim 1 including selecting the materials so that the material directed from a first of said plurality of sources is a ferromagnetic material.

6. The method defined in claim 5 including the additional step of permanently magnetizing said ferromagnetic material.

7. The method defined in claim 1 wherein said first source is controlledly activated and moved to form a tube.

8. The method defined in claim 7 wherein a third one of said plurality of sources is controlledly activated and moved to lay down inside said tube a ferromagnetic material to form a third one of said plurality of portions in the form of an armature coaxial to said cylinder and said coil.

* * * * *